United States Patent
Kosaka et al.

(10) Patent No.: US 7,433,587 B2
(45) Date of Patent: Oct. 7, 2008

(54) IN-FINDER INDICATOR FOR SINGLE-LENS REFLEX CAMERA

(75) Inventors: Fujio Kosaka, Tokyo (JP); Yoichi Washizu, Tokyo (JP)

(73) Assignee: Olympus Corporation, Tokyo (JP)

( * ) Notice: Subject to any disclaimer, the term of this patent is extended or adjusted under 35 U.S.C. 154(b) by 528 days.

(21) Appl. No.: 11/129,852

(22) Filed: May 16, 2005

(65) Prior Publication Data

US 2005/0254812 A1 Nov. 17, 2005

(30) Foreign Application Priority Data

May 17, 2004 (JP) ............................ 2004-146991

(51) Int. Cl.
*G03B 17/20* (2006.01)
(52) U.S. Cl. .................. 396/147; 396/296; 396/386
(58) Field of Classification Search ................ 396/147, 396/296, 386
See application file for complete search history.

(56) References Cited

U.S. PATENT DOCUMENTS 3,603,200 A * 9/1971 Hiruma ...................... 396/386
4,367,463 A * 1/1983 Suzuki et al. ................ 345/9
5,734,428 A    3/1998 Suda et al.

FOREIGN PATENT DOCUMENTS

| JP | 08-043913 | 2/1996 |
|---|---|---|
| JP | 2001-075149 | 3/2001 |
| JP | 2002-268128 | 9/2002 |

* cited by examiner

*Primary Examiner*—W. B. Perkey
(74) *Attorney, Agent, or Firm*—Volpe and Koenig, P.C.

(57) ABSTRACT

An in-finder indicator for a single-lens reflex camera comprises an eyepiece lens, a reflecting mirror for reflecting a beam of light from a subject, a screen having a screen surface which is subjected to surface treatment to form prisms for presenting a superimposed indication and which forms an image of the subject based on the light beam reflected by the reflecting mirror, a dach mirror having a pair of mirror surfaces for reflecting the light beam from the screen, a reflecting surface for reflecting the light beam reflected by the dach mirror surfaces and introducing the light beam to the eyepiece lens, and an illumination member disposed in a laterally-offset space between the dach mirror surfaces and the screen and introducing an illumination beam to enter the screen surface laterally of the image formed on the screen surface.

22 Claims, 5 Drawing Sheets

IN-FINDER INDICATOR FOR SINGLE-LENS REFLEX CAMERA

CROSS REFERENCE TO RELATED APPLICATIONS

This application claims the benefit of Japanese Application No. 2004-146991, filed May 17, 2004, the contents of which are incorporated by this reference.

BACKGROUND OF THE INVENTION

1. Field of the Invention

The present invention relates to an in-finder indicator and more particularly to an in-finder indicator capable of providing a superimposed indication in a finder of a single-lens reflex camera.

2. Description of the Related Art

In the field of cameras for taking photographs, AF cameras equipped with auto-focusing mechanisms (hereinafter referred to as "AF mechanisms") have hitherto been used widely.

As an indicator incorporated in a finder of such a camera equipped with the AF mechanism, an in-finder indicator capable of presenting the so-called superimposed indication has been practiced, which includes a plurality of telemetric frames (AF frames) and indicates a selected one of the plurality of telemetric frames in superimposed relation to a subject image (also called a "finder image") in a finder viewing frame.

In one example of the known in-finder indicator capable of presenting the so-called superimposed indication, a desired indication position is defined as a "position of one of the plurality of telemetric frames which is a target of the auto-focusing operation". Then, an "in-focus state" or an "out-of-focus state" is represented by switching over the indication mode of that position, and that position is displayed in superimposed relation to the finder image. Such superimposed indication enables a user of the camera to highly intuitively understand the meaning of the presented indication and to easily perform the photographing operation of the camera.

An indication device of the in-finder indicator employs, e.g., a luminous illumination member, such as a light emitting diode (LED), to switch over to one of a turned-on state and a turned-off state so that an indication state or a non-indication state is represented selectively. That in-finder indicator presenting the illumination-type superimposed indication is advantageous in that, because of high viewability in the turned-on state, the user is less likely to miss the presented display state. Another advantage is that various display colors can be selectively used by preparing a plurality of illumination light sources, and the luminous indications in different colors ensure very high viewability in presenting the indications even when the luminance of the subject is low and the area within a finder viewing frame is dark.

For a camera equipped with the above-described known in-finder indicator capable of presenting the superimposed indication, there has hitherto been proposed an in-finder indicator capable of presenting the illumination-type superimposed indication in which, for example, an indicating zone made of a group of many minute prisms is formed on an indication member that is made of a reflecting plate disposed adjacent to a focusing screen in the camera. When an illumination beam from an illumination device is obliquely emitted toward the indicating zone, only the light reflected from the minute prisms is allowed to enter a finder optical system so that the user is able to view the indicating zone with the finder.

That type of in-finder indicator comprises the indication member actually viewable with the finder, and the illumination device for emitting the illumination beam toward the indication member. Assuming here the case where such an in-finder indicator is applied to, for example, a camera equipped with a multipoint telemeter having a plurality of telemetric points, the in-finder indicator is used to indicate telemetric frames.

In the multipoint telemeter, a plurality of telemetric locations are scattered over a wide area within a finder viewing frame, and the telemetric frame corresponding to the indicating zone is set for each of the telemetric locations. The illumination device adapted for the multipoint telemeter is required to be able to selectively illuminate predetermined locations scattered over a wide area of the indication member, i.e., the locations of the plurality of telemetric frames.

Further, various types of in-finder indicators other than the above-described one have hitherto been proposed as disclosed in, e.g., Japanese Patent No. 3272871 and Japanese Unexamined Patent Application Publication No. 2002-268128.

An in-finder indicator disclosed in, e.g., Japanese Patent No. 3272871 is adapted for use in a single-lens reflex camera equipped with a finder unit comprising a penta prism, etc. In this in-finder indicator, as shown in FIG. 8, illumination members for presenting the superimposed indication (such as a light emitting devices 118 and a light projecting lens 119 for projecting a beam of light emitted from each light emitting device in a predetermined direction) are disposed in a space above a penta prism 112 of the finder unit, and the illumination beams from the illumination members are introduced to enter the interior of the penta prism 112 from a predetermined surface 112a (inclined surface obliquely facing the upper left side in FIG. 8). Note that FIG. 8 is a schematic sectional view showing a layout of principal parts of the disclosed in-finder indicator, which are disposed inside the camera.

In the disclosed in-finder indicator thus constructed, the illumination beam emitted from the light emitting device 118 enters the light projecting lens 119 where an optical path A is bent in a predetermined direction such that the light beam enters the predetermined surface 112a of the penta prism 112. Then, the light beam passes the interior of the penta prism 112 and exits from another predetermined surface 112b. Thereafter, the light beam passes through a condenser lens 115 and reaches a predetermined one of a plurality of indicating zones (telemetric frames) on an indication member 113, thereby to illuminate it.

Thus, with efficient layout of the light emitting devices inside the camera, a more compact camera can be realized even when the plurality of indicating zones are set over a wide area within a photographing frame.

An in-finder indicator disclosed in Japanese Unexamined Patent Application Publication No. 2002-268128 is adapted for use in a single-lens reflex camera equipped with a finder unit comprising, instead of the glass-made penta prism, a hollow penta mirror, etc. Illumination members are disposed at an upper part of an opening of the penta mirror at a position closer to an eyepiece optical system, and beams of light emitted from light emitting devices of the illumination members are introduced to pass the interior of the penta mirror, thereby illuminating indications on an indication member disposed at a lower part of the penta mirror.

With that arrangement, since the hollow penta mirror is used instead of the glass-made penta prism and the illumination members are disposed at the opening part of the penta mirror, an in-finder indicator can be constructed in a simplified structure with efficient use of a space. As a result, a more compact camera can be realized.

Meanwhile, single-lens reflex cameras equipped with pop-up built-in strobe units have been widely practiced in recent years. In such a camera, the pop-up built-in strobe unit is usually disposed at the upper part of a penta prism in the vicinity thereof.

SUMMARY OF THE INVENTION

The present invention provides an in-finder indicator for a single-lens reflex camera, the indicator comprising an eyepiece lens, a reflecting mirror for reflecting a beam of light from a subject, a screen having a screen surface which is subjected to surface treatment to form prisms for presenting a superimposed indication and which forms an image of the subject based on the light beam reflected by the reflecting mirror, a dach mirror having a pair of mirror surfaces for reflecting the light beam from the screen, a reflecting surface for reflecting the light beam reflected by the mirror surfaces of the dach mirror and introducing the light beam to the eyepiece lens, and an illumination member disposed between the mirror surfaces of the dach mirror and the screen and lying in a plane perpendicular to an optical axis interconnecting the mirror surfaces of the dach mirror and the screen, and introducing an illumination beam to enter the screen surface from the lateral directions of the image formed on the screen surface.

Advantages of the present invention will be more clearly apparent from the following detailed description.

BRIEF DESCRIPTION OF THE DRAWINGS

FIG. 8 is a partial sectional view of a known in-finder indicator capable of presenting superimposed indication in a known single-lens reflex camera equipped with a finder unit comprising a penta prism and the like.

DETAILED DESCRIPTION OF THE PREFERRED EMBODIMENTS

Figure 1:
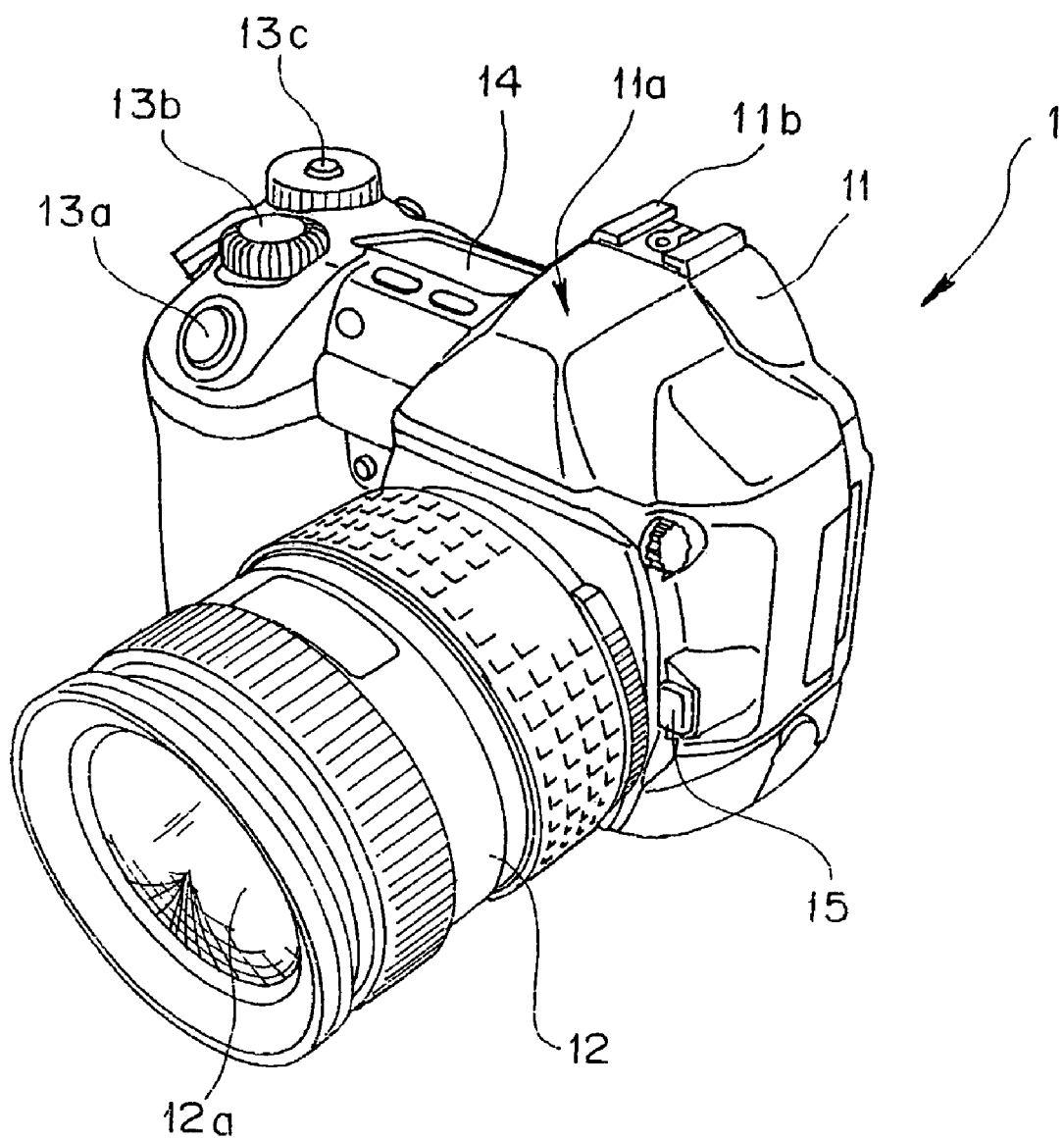
FIG. 1 is a perspective view showing the simplified appearance of a camera equipped with an in-finder indicator according to one embodiment of the present invention.

As shown in FIG. 1, a camera 1 equipped with an in-finder indicator according to one embodiment comprises mainly a camera body 11 and a taking lens barrel 12. The camera body 11 incorporates therein, for example, a circuit board which mounts thereon a control circuit for performing overall control of the camera 1, and the like, an image capturing unit including an image capturing device 26 (not shown in FIG. 1, see FIG. 3), and the like, a circuit board 27 (not shown in FIG. 1, see FIG. 3) which mounts thereon the image capturing unit, a recording unit for accommodating a recording medium to record image data obtained by the image capturing unit, and a power supply unit for accommodating a power source cell and outputting power from the cell to electric circuits inside the camera 1. The taking lens barrel 12 incorporates therein a photographing optical system 12a, driving members for the photographing optical system 12a, etc. The taking lens barrel 12 is, by way of example, freely detachably attached to the camera body 11. To make the lens barrel detachable, a lens barrel attachment/detachment actuating member 15 is disposed on a front surface of the camera body 11 at a predetermined position. The lens barrel attachment/detachment actuating member 15 is actuated to detach the taking lens barrel 12, which is attached to the front surface of the camera body 11 at a predetermined position, which a user's certain manipulation, and it serves as a part of a mechanism for making the camera body 11 and the taking lens barrel 12 free from the mutually attached state.

On an outer surface of the camera body 11, there are disposed not only various operating members, such as a release operating member 13a, a dial operating member 13b, an operation mode switching-over dial 13c, and the like but also a liquid crystal display 14 for displaying, e.g., the setting state of the camera 1. Various items of setting information displayed on the liquid crystal display 14 are provided in a predetermined manner in response to the operations of the various operating members of the camera 1.

Substantially at the middle of an upper surface of the camera body 11, a projection 11a is formed to project upward. Inside the projection 11a, a finder unit 16 (see FIGS. 2 and 3) is disposed which comprises a hollow penta mirror 17 formed of a dach (roof) mirror having a hollow structure, etc.

Further, on the outer surface of the camera body 11, a hot shoe 11b is provided at the rear side of the projection 11a. A separate strobe unit (not specifically shown) is mounted to the hot shoe 11b and is connected to the camera body 11, to thereby establish electrical connection between an electric circuit (not specifically shown) inside the camera body 11 and the strobe unit.

Figure 2:
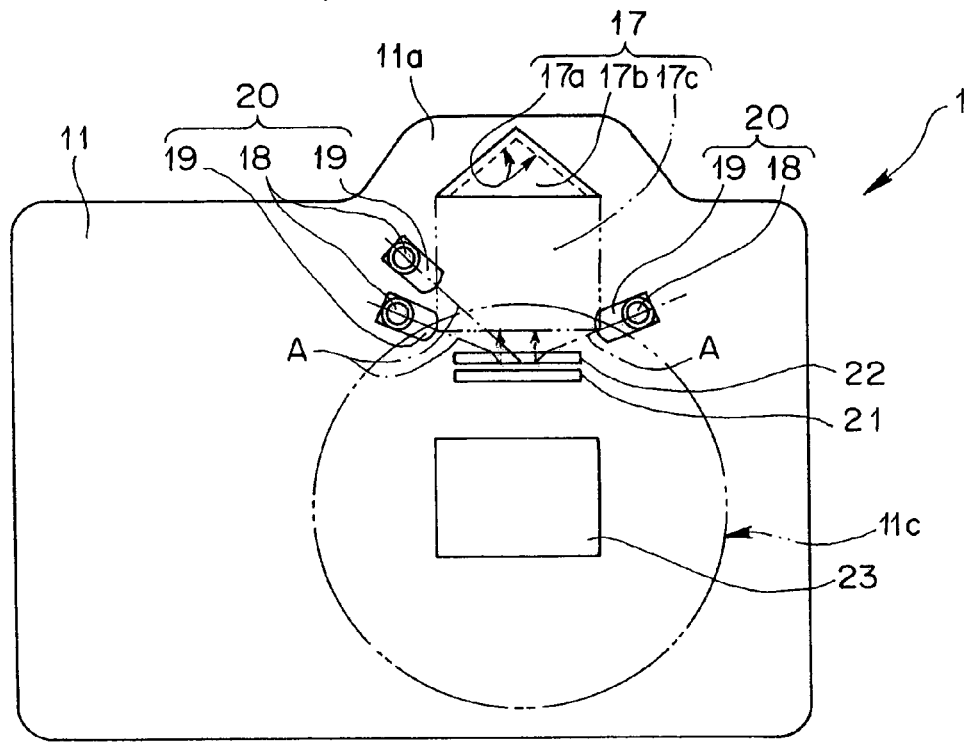
FIG. 2 is a front view showing the layout of the in-finder indicator arranged inside the camera shown in FIG. 1.
Figure 3:
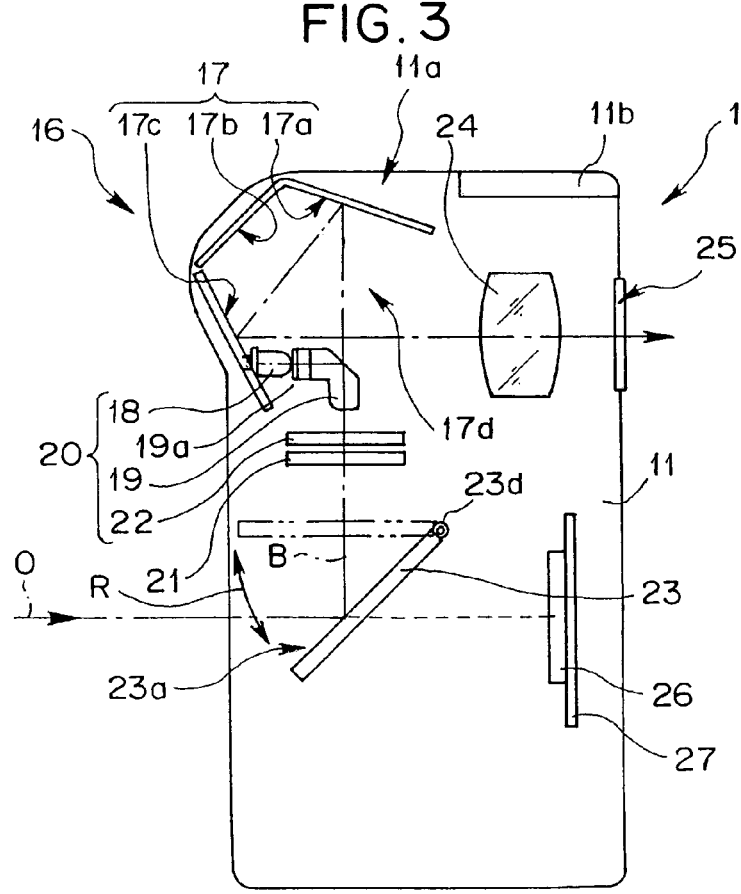
FIG. 3 is a side view showing the layout of the in-finder indicator arranged inside the camera shown in FIG. 1.

Inside the camera body 11, as shown in FIGS. 2 and 3, a reflecting mirror 23 is disposed to receive a light beam having entered the camera body 11 after passage through the photographing optical system 12a (see FIG. 1), and to guide the light beam toward the finder unit 16. In a usual state, the reflecting mirror 23 is arranged in a posture inclined at an angle of about 45° with respect to an optical axis O of the photographing optical system 12a. In this state, a reflecting surface 23a of the reflecting mirror 23 is arranged to face the taking lens barrel 12 (see FIG. 1) disposed in front of the camera body 11. Further, the finder unit 16 is disposed above the reflecting mirror 23. With such an arrangement, the reflecting mirror 23 reflects the incoming light beam from the subject upward so that the light beam is guided to the finder unit 16.

It is here assumed that the above-mentioned usual state is called a shooting ready state and the position of the reflecting mirror 23 in the usual state (i.e., the position indicated by solid lines in FIG. 3) is called a shooting ready position.

Further, the reflecting mirror 23 is rotatably supported at its one end 23d to a stationary member (not specifically shown) of the camera body 11. Therefore, the reflecting mirror 23 is a movable mirror that is provided to be able to rotate in either direction, indicated by a double-headed arrow R in FIG. 3, about the one end 23d serving as a pivot between the shooting ready position (i.e., the position indicated by solid lines in FIG. 3) and a shooting position (i.e., a position indicated by dotted lines in FIG. 3).

Behind the reflecting mirror 23, the image capturing device 26 is disposed on an extension of the optical axis O of the photographing optical system 12a with its image capturing surface arranged parallel to a plane perpendicular to the optical axis O. The image capturing device 26 is mounted on the circuit board 27.

In the camera 1, therefore, when the image capturing operation is performed using the image capturing device 26, the reflecting mirror 23 is rotated to pop upward with the one end 23d serving as a pivot from the shooting ready position indicated by solid lines in FIG. 3, whereby the reflecting mirror 23 is moved to the predetermined shooting position (i.e., a position indicated by dotted lines in FIG. 3) so that the beam of light from the photographing optical system 12a is received by a light receiving surface of the image capturing device 26.

As shown in FIGS. 2 and 3, the finder unit 16 comprises a focusing screen 21 for adjusting a focal point, an indication member 22 constituting a part of an in-finder indicator 20 (described later) and serving as a screen for presenting a superimposed indication in the form of a plate-like member on which a plurality of predetermined indicating zones (predetermined telemetric frames 22a; see FIG. 4) are formed, a hollow penta mirror 17 for enabling the user to view an image of the focusing screen 21 (i.e., a finder image for observing the subject) as a normal erect image at an eye level, an eyepiece lens 24 for providing, in enlarged scale, a subject image formed by the light beam outgoing from the hollow penta mirror 17, and so on. Additionally, a finder window 25 is formed in a predetermined area in a rear surface of the camera body 11 at a position facing the eyepiece lens 24.

The hollow penta mirror 17 has an inner cavity defined by dach reflecting surfaces 17a disposed at the upper side and serving as a pair of dach surfaces that are arranged perpendicularly to each other and are symmetrical with respect to an imaginary line extending in the vertical direction and passing through a ridgeline of surfaces 17a, a front reflecting surface 17c disposed at a position facing the ridgeline of the dach reflecting surfaces 17a and arranged at a predetermined angle with respect to the ridgeline, and a non-reflecting surface 17b disposed in front of the dach reflecting surfaces 17a above the front reflecting surface 17c and coupling the dach reflecting surfaces 17a and the front reflecting surface 17c to each other in such a manner as to shield light from entering the inner cavity of the hollow penta mirror 17. Mirror surfaces are formed, for example, by vapor deposition of aluminum, silver or the like on inner wall surfaces of the reflecting surfaces 17a, 17c.

Accordingly, the light beam having entered the hollow penta mirror 17 from below is reflected by the dach reflecting surfaces 17a and is introduced toward the front reflecting surface 17c. The front reflecting surface 17c receives the light beam having been reflected by the dach reflecting surfaces 17a and reflects it toward the eyepiece lens 24. In such a way, the light beam is introduced to the eyepiece lens 24 through an opening 17d of the hollow penta mirror 17 and then exits from the finder window 25. The user is able to view the finder image by placing an eye at the finder window 25.

The in-finder indicator (hereinafter referred to simply as the "indicator") 20 is disposed near the hollow penta mirror 17. The indicator 20 comprises light emitting devices 18, e.g., light emitting diodes, serving as illumination members, light projecting prisms 19 for receiving illumination beams emitted from the light emitting devices 18 and guiding the illumination beams to exit toward respective predetermined locations, along the above-described indication member 22, etc.

Each of the light projecting prisms 19 is formed of a plastic material, e.g., an acrylic resin, and has a shape for changing the direction of advance of the incident illumination beam and causing it to exit in a predetermined direction. As a result, the illumination beam emitted from each of the light emitting devices 18 can be guided in the desired direction.

In this connection, a mask member 19a having an opening of a predetermined size is disposed at a surface (incident surface) of the light projecting prism 19, which is located to face the light emitting device 18. The mask member 19a provides an aperture through which the illumination beam emitted from the light emitting device 18 enters the light projecting prism 19.

Further, inner reflecting surfaces formed by inner wall surfaces of the light projecting prism 19 are subjected to surface treatment, e.g., vapor deposition of aluminum, for the purpose of increasing reflectivity. The surface treatment serves to more effectively reflect the light beam having entered the light projecting prism 19 for changing the direction of advance thereof such that the light beam is guided in the desired direction.

A surface of the light projecting prism 19 from which the light beam exits is formed, for example, in the shape of convex lens having an outward projecting surface. In other words, the light projecting prism 19 is formed such that its exit part (exiting surface) performs a lens function. Accordingly, the light projecting prism 19 can project the light beam having an illumination area, which corresponds to the opening size of the mask member 19a, to only a region that is to be illuminated.

Figure 4:
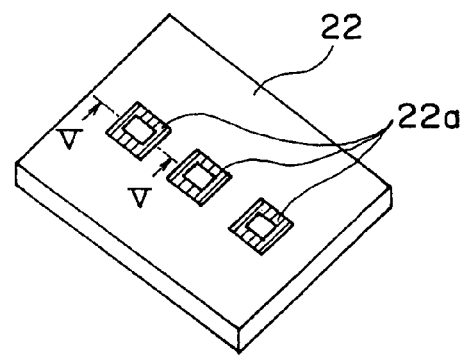
FIG. 4 is a perspective view showing the appearance of an indication member of the in-finder indicator in the camera shown in FIG. 1, the indication member being taken out alone.

As shown in FIG. 4, the indication member 22 is formed of a flat plate member made of a plastic material, e.g., an acrylic resin. A plurality (three in this embodiment) of indicating zones, i.e., telemetric frames 22a, are formed in predetermined locations on the surface of the indication member 22.

In the indicator 20 thus constructed, therefore, the illumination beam emitted from each of the light emitted devices 18 enters the light projecting prism 19 after being restricted to the predetermined area by the opening of the mask member 19a at the incident surface of the light projecting prism 19. After repeating reflections of a predetermined number of times between the inner reflecting surfaces of the light projecting prism 19, the light beam is introduced to the exiting surface of the light projecting prism 19 and then exits to the outside. The illumination beam having exited the light projecting prism 19 from the exiting surface is projected to a predetermined one of the plurality of indicating zones (telemetric frames 22a) corresponding to the relevant light projecting prism 19, which are formed on the surface (screen surface) of the indication member (screen) 22.

Figure 5:
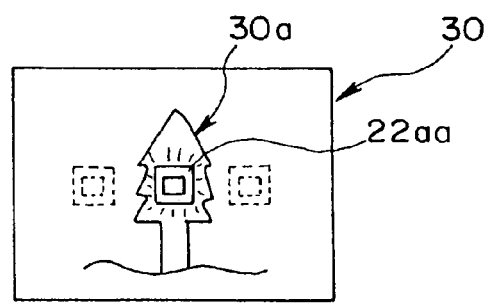
FIG. 5 is an illustration showing an example of a finder view image capable of being viewed with a finder in the camera shown in FIG. 1.

FIG. 5 shows, by way of example, a finder view image capable of being viewed with the finder in that state. The example shown in FIG. 5 represents a finder view screen 30 obtained when the illumination beam emitted from a light emitting device 18 is projected to a central one of the three telemetric frames 22a shown in FIG. 4.

Stated another way, in the case of FIG. 5, a location on the finder view screen 30 corresponding to the central telemetric frame 22a shown in FIG. 4 is represented in a visually recognizable state, i.e., in an illuminated state.

The principle for presenting the illumination-type superimposed indication with the indicator 20 constructed of the illumination members (light emitting devices 18), the indication member 22, etc. will be described below with reference to FIGS. 4 through 6.

The telemetric frames 22a (see FIG. 4) formed on the surface (screen surface) of the indication member (screen) 22 each comprise a region subjected to surface treatment such that many minute prisms are formed to present the superimposed indication. As shown in FIG. 6, each of the telemetric frames 22a has a sectional shape defined by a group of triangular bosses each having a ridgeline opposed to the focusing screen 21.

With such a structure, the light beam having been reflected upward by the reflecting mirror 23 after passing through the photographing optical system 12a (see FIG. 1) passes through the focusing screen 21 and enters the telemetric frame 22a of the indication member 22. Then, the light beam is refracted by the prisms formed in the telemetric frame 22a so as to deviate from the direction toward the hollow penta mirror 17 (i.e., toward the eyepiece lens 24). In the usual state, therefore, the region of the telemetric frame 22a is viewed as being darker than the surrounding region.

On the other hand, the illumination beam emitted from the indicator 20 disposed obliquely above the indication member 22 is projected toward the predetermined telemetric frame 22a on the surface of the indication member 22 (as indicated by a symbol L in FIG. 6) laterally of a space between the dach reflecting surfaces (dach surface) 17a of the hollow penta mirror (dach mirror) 17 and the surface (screen surface) of the indication member (screen) 22. In this case, the light beam L enters the indication member 22 and is totally reflected by one slope 22aa of each of the prisms in the telemetric frame 22a. Then, the light beam enters the other slope 22ab of the prism in opposed relation to the one slope 22aa and is totally reflected again by the other slope 22ab to advance upward (as indicated by a symbol L1 in FIG. 6). Accordingly, the light beam L1 is introduced to the eyepiece lens 24 through the hollow penta mirror 17 so that the user can view the light beam L1 together with the finder view in a superimposed manner.

Figure 6:
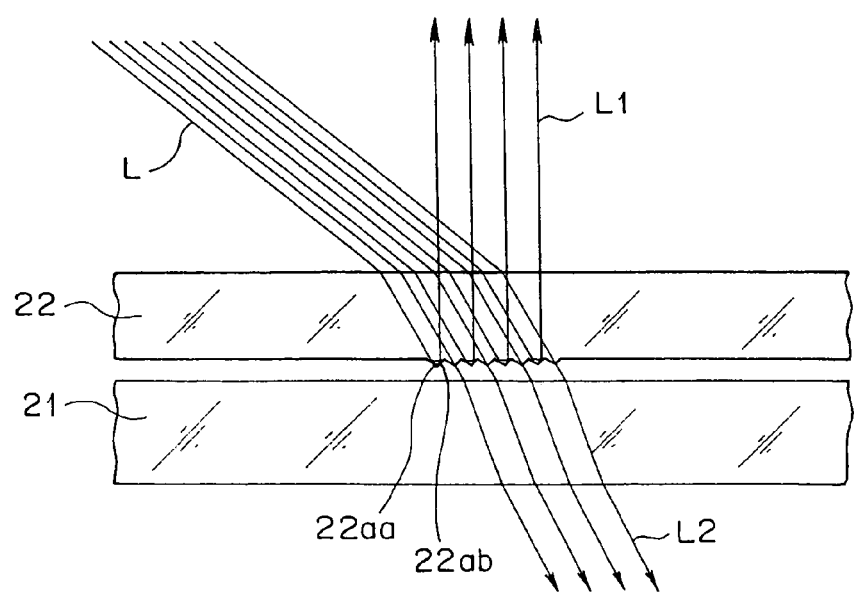
FIG. 6 is an enlarged partial sectional view showing, in enlarged scale, a part of a section (taken along line V-V in FIG. 4) of a telemetric frame in the indication member shown in FIG. 4.

A portion of the illumination beam emitted from the indicator 20, which does not enter the prisms in the telemetric frame 22a, passes through the focusing screen 21 and then exits toward the reflecting mirror 23 (as indicated by a symbol L2 in FIG. 6; also see FIG. 3). Therefore, that portion of the illumination beam is not viewable by the user.

As described above, the telemetric frame 22a formed of the many minute prisms has a characteristic of receiving the illumination beam emitted from the indicator 20 disposed obliquely above the telemetric frame 22a and deflecting the received light beam upward.

Then, by arranging the light emitting device 18 as a light source on an optical path extending from the user's eye to the indicator 20 through each telemetric frame 22a, the user can view the telemetric frame 22a in an illuminated state with the action of the illumination beam emitted from the light emitting device 18.

In the case of using, e.g., a red LED as the light emitting device 18 of the indicator 20, therefore, when the in-focus state is obtained at the position of a certain telemetric frame 22a, the telemetric frame 22a which is usually viewed black is indicated red by turning on the light emitting device 18 corresponding to that telemetric frame 22a. This red indication of the telemetric frame 22a is displayed in superimposed relation to the finder image. By viewing the telemetric frame 22a indicated red, the user is able to confirm the position within the finder view image, which has come into the in-focus state, in the camera 1 during use.

Thus, by utilizing the characteristic obtained with the above-described construction of the telemetric frames 22a formed in the indication member 22 of the indicator 20 and controlling the illumination of the light emitting device 18, it is possible to control the illuminated indication of a desired one of the plurality of telemetric frames 22a, the display color of the illuminated indication, etc.

Instead of the above-described indication member, an indication member having a similar function can also be obtained by forming reflecting surfaces in predetermined locations on the focusing screen 21 by vapor deposition.

According to the embodiment described above, in the camera 1 equipped with the finder unit 16 constituted by employing the hollow penta mirror 17 having an inner cavity, the in-finer indicator 20 is constructed such that the light emitting devices 18 and the light projecting prisms 19 are arranged inside the camera body 11 near opposite side surfaces of the finder unit 16, and the indication member 22 for reflecting a part of the incident light beam toward the finder unit 16 is disposed in the optical paths of the illumination beams emitted from the light emitting devices 18 through the light projecting prisms 19.

With the action of the illumination beam emitted from the light emitting device 18, therefore, the superimposed indication can be realized such that the corresponding predetermined telemetric frame 22a is viewable in superimposed relation to the finder image.

In addition, since the various components of the indicator 20 are arranged to be accommodated inside the camera body 11, it is possible to avoid an increase in size of the camera 1 itself, and to reduce restriction on design of the camera appearance, thus resulting in increased flexibility.

Furthermore, a space above the hollow penta mirror 17 can be employed for another purpose of use, such as for accommodating a relatively large member, e.g., a flash emitting portion of a pop-up built-in strobe unit, without increasing the size of the camera 1.

Figure 7:
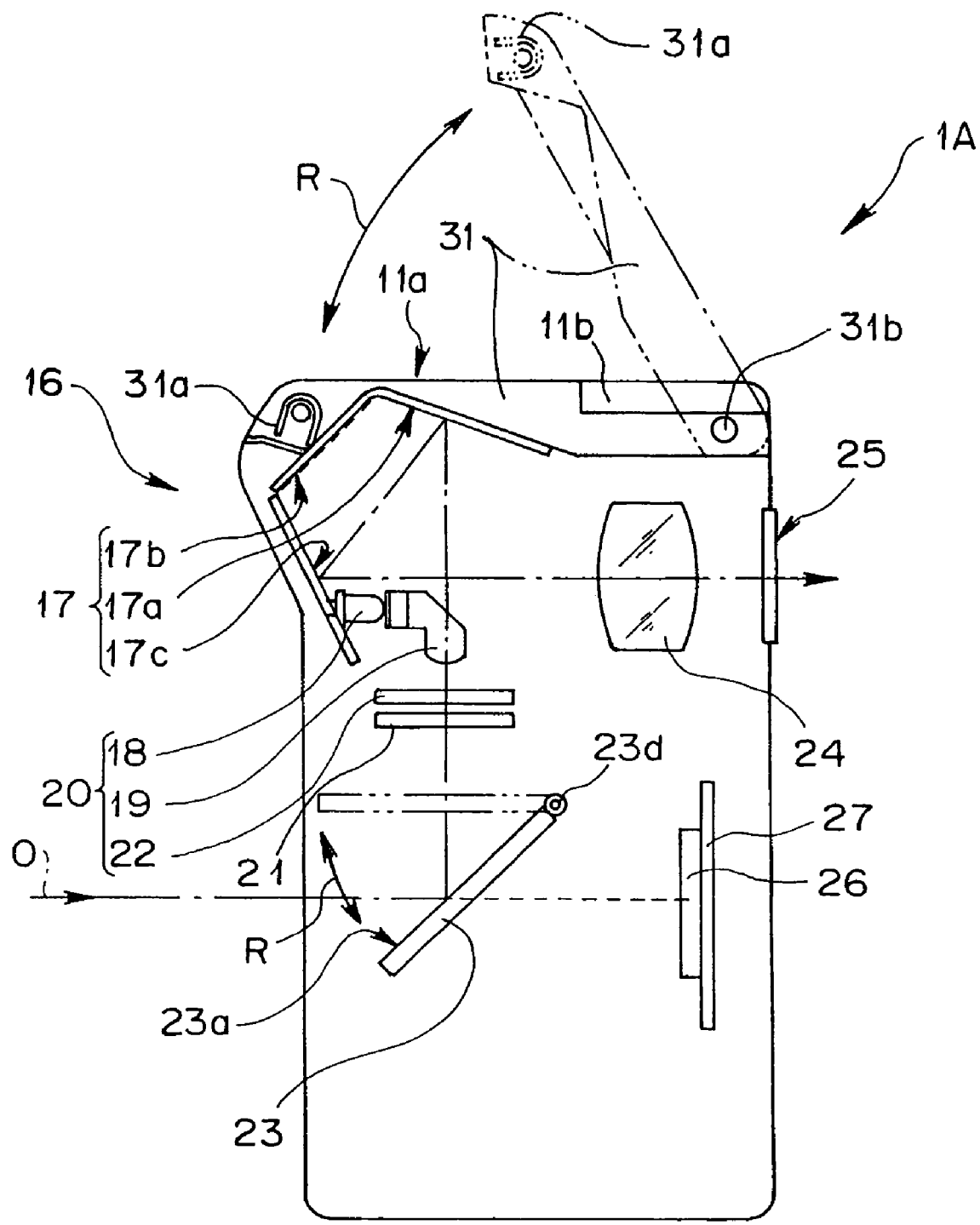
FIG. 7 is a side view showing the layout of an in-finder indicator arranged inside the camera according to a modification of the one embodiment of the present invention.
Figure 8:
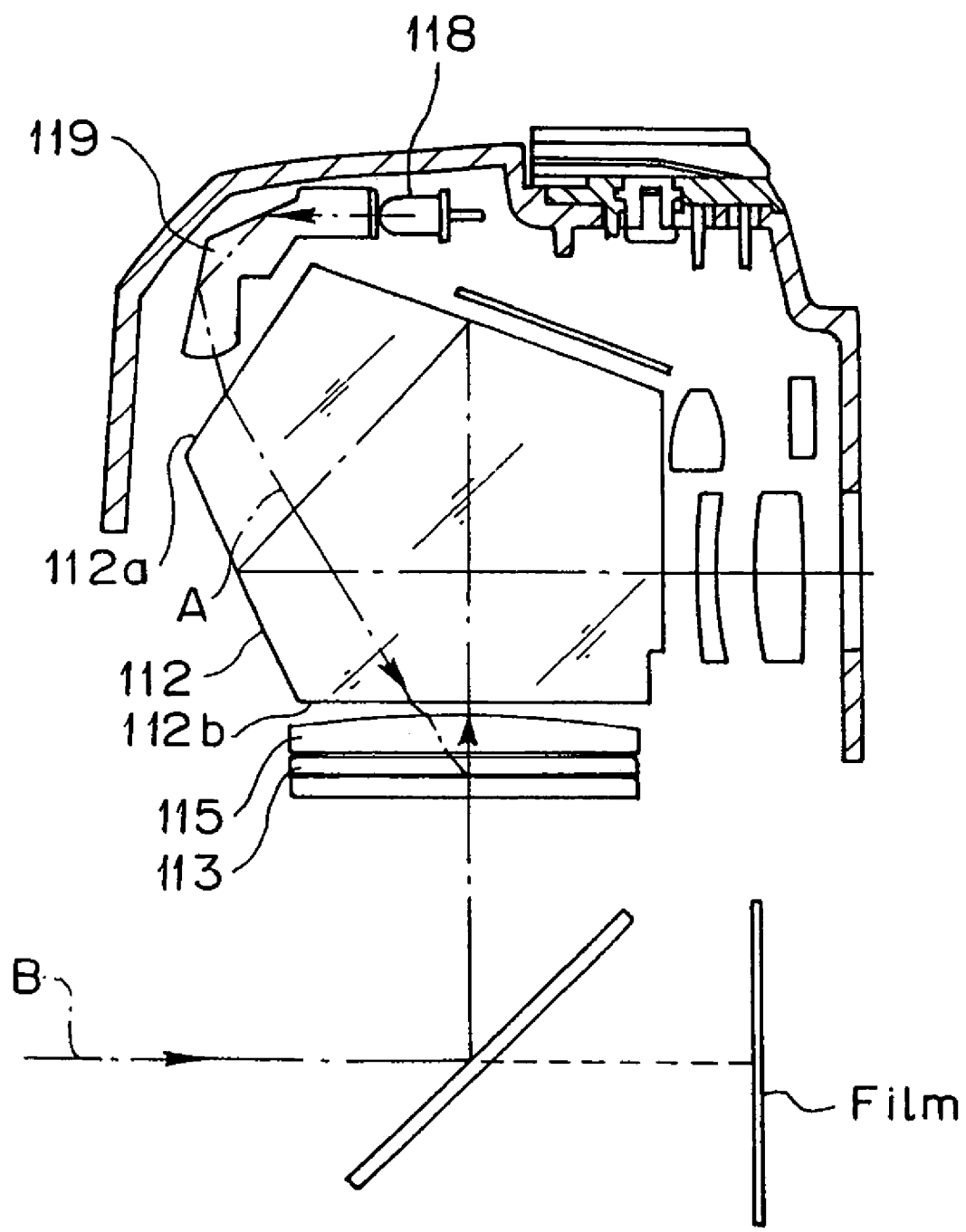

A modification of the above-described embodiment will be described below. This modification represents the case where the in-finder indicator of the present invention is applied to a camera equipped with a pop-up built-in strobe unit. In FIG. 7, the state where the pop-up built-in strobe unit is accommodated in the camera body is shown as a usual state by solid lines, and the state where the built-in strobe unit is popped up is shown by two-dot-chain lines (imaginary lines).

More specifically, in this modification, a pop-up built-in strobe unit 31 is additionally provided in the camera 1 (see FIG. 3) equipped with the in-finder indicator 20 according to the above-described one embodiment.

In a camera 1A of this modification, as shown in FIG. 7, a pop-up built-in strobe unit (hereinafter referred to simply as "built-in strobe unit") 31 is disposed near the projection 11a that is provided substantially at the middle of the upper surface of the camera body 11. The built-in strobe unit 31 is rotatably supported at its one end over a predetermined angular range in a direction indicated by a double-headed arrow R in FIG. 7 about a shaft 31b serving as a pivot, the shaft 31b being fixed to a stationary member (not shown) inside the camera body 11. In the illustrated example, the built-in strobe unit 31 is rotatable between the accommodated state (state not in use) shown by solid lines in FIG. 7, and the popped-up state (state in use) shown by two-dot-chain lines in FIG. 7.

Then, as shown in FIG. 7, when the built-in strobe unit 31 is in the accommodated state, a flash light emitting portion 31a of the built-in strobe unit 31 is laid in the space above the hollow penta mirror 17. The remaining structure is exactly the same as that of the above-described embodiment. Note that components substantially similar to those in the above-described embodiment are denoted by the same symbols and a detailed description of those components is omitted here.

As understood from this modification, the in-finder indicator of the present invention can be easily applied to the camera 1A equipped with the pop-up built-in strobe unit in the same manner as that in the above-described embodiment without increasing the camera size.

It is apparent that a variety of different embodiments of the present invention can be made in accordance with the foregoing disclosure without departing from the spirit and scope of the invention. The present invention is in no way limited by the particular embodiments except as defined in the appended claims.

What is claimed is:

1. An in-finder indicator for a single-lens reflex camera, comprising:
   an eyepiece lens;
   a reflecting mirror for reflecting a beam of light from a subject;
   a screen having a screen surface which is subjected to surface treatment to form prisms for presenting a superimposed indication and which forms an image of the subject based on the light beam reflected by the reflecting mirror;
   a dach mirror having a pair of mirror surfaces for reflecting the light beam from the screen and being open along opposite lateral sides of the dach mirror;
   a reflecting surface for reflecting the light beam reflected by the mirror surfaces of the dach mirror and introducing the light beam to the eyepiece lens; and
   an illumination member disposed at a space in a direction lateral to a region between the mirror surfaces of the dach mirror and the screen for introducing an illumination beam to enter the screen surface from a direction lateral to a direction of the image formed on the screen surface.

2. The in-finder indicator for the single-lens reflex camera according to claim 1, further comprising a light projecting prism for guiding the illumination beam from the illumination member to the screen surface laterally of the image formed on the screen surface.

3. The in-finder indicator for the single-lens reflex camera according to claim 2, wherein the light projecting prism has a lens.

4. The in-finder indicator for the single-lens reflex camera according to claim 1, wherein the superimposed indication is presented to indicate an in-focus range.

5. The in-finder indicator for the single-lens reflex camera according to claim 1, wherein the reflecting mirror is a movable mirror.

6. An in-finder indicator for a single-lens reflex camera, comprising:
   an eyepiece lens;
   a reflecting mirror for reflecting a beam of light from a subject;
   a screen having a screen surface which is subjected to surface treatment to form prisms therein for presenting a superimposed indication and which forms an image of the subject based on the light beam reflected by the reflecting mirror;
   a dach mirror having a pair of mirror surfaces for reflecting the light beam from the screen and being open along opposite lateral sides of the dach mirror;
   a reflecting surface for reflecting the light beam reflected by the mirror surfaces of the dach mirror and introducing the light beam to the eyepiece lens; and
   an illumination member disposed between the mirror surfaces of the dach mirror and the screen and lying in a plane perpendicular to an optical axis extending between the mirror surfaces of the dach mirror and the screen, and introducing an illumination beam to enter the screen surface from a direction lateral to a direction of the image formed on the screen surface.

7. The in-finder indicator for the single-lens reflex camera according to claim 6, further comprising a light projecting prism (19) for guiding the illumination beam from the illumination member to the screen surface laterally of the image formed on the screen surface.

8. The in-finder indicator for the single-lens reflex camera according to claim 7, wherein the light projecting prism has a lens.

9. The in-finder indicator for the single-lens reflex camera according to claim 6, wherein the superimposed indication is presented to indicate an in-focus range.

10. The in-finder indicator for the single-lens reflex camera according to claim 6, wherein the reflecting mirror is a movable mirror.

11. The in-finder indicator for the single-lens reflex camera according to claim 1, said screen further having a second screen surface substantially parallel to the screen surface subjected to surface treatment;
    the illumination beam from said illumination member entering said second screen surface end being aligned at an oblique angle to said second surface so that the illumination beam enters the screen and is directed to a region of the surface treatment.

12. The in-finder indicator for the single-lens reflex camera according to claim 2, wherein light from the illumination member guided by the light projecting prism is emitted from the projecting prism and projected toward one surface of the screen.

13. The in-finder indicator for the single-lens reflex camera according to claim 3, wherein an exit end of the light projecting prism is configured to form the lens which is an integral part of the light projecting prism.

14. The in-finder indicator for the single-lens reflex camera according to claim 13, wherein the exit end as configured to have a curved, convex surface.

15. The in-finder indicator for the single-lens reflex camera according to claim 1, wherein the screen is provided with a plurality of illumination members, each disposed at different locations on opposite lateral sides of the mirror surfaces of the dach mirror and the screen and a plurality of light projecting prisms each for projecting light from one of the illumination members to the screen so that illumination beams enter one surface of the screen at oblique angles and at different locations along the screen to selectively provide indications at said different locations of the screen.

16. The in-finder indicator for the single-lens reflex camera according to claim 2, wherein the light projecting prism is provided with input and output ends and internal reflecting surfaces therebetween for repeatedly reflecting a light beam introduced to the input end and exiting from the output end.

17. The in-finder indicator for the single-lens reflex camera according to claim 16 wherein the exit end of the light projecting prism functions as a lens for focusing the exiting light.

18. The in-finder indicator for the single-lens reflex camera according to claim 2, wherein the light projecting prism is provided with a shaped configuration to receive an incident beam at an input of the light projecting prism and change a direction of a exiting beam at an output of the light projecting prism.

19. The in-finder indicator for the single-lens reflex camera according to claim 15, wherein each of the illumination members provide a light beam of a color different from the other illumination members.

20. The in-finder indicator for the single-lens reflex camera according to claim 15, wherein the illumination members comprise light emitting diodes.

21. The in-finder indicator for the single-lens reflex camera according to claim 15, wherein each of the light projecting prisms emit light beams at different angles to one surface of said screen.

22. The in-finder indicator for the single-lens reflex camera according to claim 1, wherein the screen is a focusing screen for adjusting a focal point and thereby serving the dual functions of presenting a superimposed indication and providing the focal point.

* * * * *

UNITED STATES PATENT AND TRADEMARK OFFICE
CERTIFICATE OF CORRECTION

| | |
|---|---|
| PATENT NO. | : 7,433,587 B2 |
| APPLICATION NO. | : 11/129852 |
| DATED | : October 7, 2008 |
| INVENTOR(S) | : Fujio Kosaka et al. |

It is certified that error appears in the above-identified patent and that said Letters Patent is hereby corrected as shown below:

At claim 6, column 9, line 58, after the word "prisms", delete "therein".

Signed and Sealed this

Twenty-eighth Day of April, 2009

JOHN DOLL
*Acting Director of the United States Patent and Trademark Office*